United States Patent
Philippot

(10) Patent No.: US 9,353,641 B2
(45) Date of Patent: May 31, 2016

(54) CONTROLLING BLADE TIP CLEARANCES IN A TURBINE ENGINE

(75) Inventor: Vincent Philippot, Solers (FR)

(73) Assignee: SNECMA, Paris (FR)

( * ) Notice: Subject to any disclaimer, the term of this patent is extended or adjusted under 35 U.S.C. 154(b) by 1109 days.

(21) Appl. No.: 13/394,636

(22) PCT Filed: Sep. 7, 2010

(86) PCT No.: PCT/FR2010/051855
§ 371 (c)(1),
(2), (4) Date: Mar. 7, 2012

(87) PCT Pub. No.: WO2011/030051
PCT Pub. Date: Mar. 17, 2011

(65) Prior Publication Data
US 2012/0167584 A1    Jul. 5, 2012

(30) Foreign Application Priority Data
Sep. 8, 2009 (FR) ...................... 09 04275

(51) Int. Cl.
*F01D 11/24* (2006.01)
*F01D 19/02* (2006.01)
*F01D 25/10* (2006.01)

(52) U.S. Cl.
CPC ............... *F01D 11/24* (2013.01); *F01D 19/02* (2013.01); *F01D 25/10* (2013.01); *F05D 2260/201* (2013.01); *Y02T 50/676* (2013.01)

(58) Field of Classification Search
CPC .............. F02C 6/08; F02C 9/18; F01D 11/24; F01D 19/02; F01D 25/10
See application file for complete search history.

(56) References Cited

U.S. PATENT DOCUMENTS

| 4,482,293 A | 11/1984 | Perry |
| 5,205,115 A | 4/1993 | Plemmons et al. |
| 5,281,085 A * | 1/1994 | Lenahan ................. F01D 11/24 415/116 |
| 2009/0037035 A1* | 2/2009 | Hershey ................. F01D 11/24 701/3 |

FOREIGN PATENT DOCUMENTS

| EP | 0 492 865 | 7/1992 |
| EP | 0 541 325 | 5/1993 |
| FR | 2 828 908 | 2/2003 |
| FR | 2 890 685 | 3/2007 |
| GB | 2 103 718 | 2/1983 |
| GB | 2 117 450 | 10/1983 |
| WO | WO 9855738 A1 * 12/1998 ............ F01D 11/24 |

OTHER PUBLICATIONS

U.S. Appl. No. 11/519,834, filed Sep. 13, 2006, Philippot.
International Search Report issued on Dec. 21, 2010 in PCT/FR10/051855 filed on Sep. 7, 2010.

* cited by examiner

*Primary Examiner* — Phutthiwat Wongwian
*Assistant Examiner* — Stefan Ibroni
(74) *Attorney, Agent, or Firm* — Oblon, McClelland, Maier & Neustadt, L.L.P.

(57) ABSTRACT

A turbine engine including a controller controlling clearance between tips of moving blades of a high-pressure turbine and an outer casing surrounding the blades, by cooling the outer casing by the impact of air taken from a high-pressure compressor stage of the engine, and by electric heating of top and bottom portions of the outer casing.

11 Claims, 2 Drawing Sheets

CONTROLLING BLADE TIP CLEARANCES IN A TURBINE ENGINE

BACKGROUND OF THE INVENTION (1) Field of Invention

The present invention relates to a turbine engine, such as an airplane turboprop or turbojet, the engine being fitted with means for controlling blade tip clearances, and the invention also relates to a method of controlling such clearances.

(2) Description of Related Art Including Information Disclosed Under 37 CFR 1.97 and 1.98

In conventional manner, air passing through a turbine engine flows from upstream to downstream through a low-pressure compressor and a high-pressure compressor, and then penetrates into a combustion chamber from which the outlet feeds a high-pressure turbine having its rotor driving the rotor of the high-pressure compressor, and then a low-pressure turbine having its rotor driving the rotor of the low-pressure compressor.

In general, the high-pressure turbine comprises a bladed rotor wheel situated between two rows of stator vanes, an upstream row and a downstream row, that are carried by an outer casing, with a small amount of radial clearance being provided between the tips of the moving blades and the outer casing. The rotor wheel comprises a disk carrying the blades and connected to the shaft of the high-pressure turbine.

While the turbine engine is in operation, it is important to minimize the radial clearance at the tips of the blades in order to avoid air leaking and in order to guarantee maximum performance of the engine.

Nevertheless, it is found difficult to adjust this radial clearance, since the dimensional variations in operation of stationary parts are different from the dimensional variations of rotary parts. All of the parts are subjected to temperature variations in the combustion gas, thereby giving rise to successive expansions and contractions depending on the speed of the engine, but the temperature variations and the corresponding dimensional variations of the rotary parts take place more slowly than those of the stationary parts because of the thermal inertia of the mass constituting the rotor disk of the high-pressure turbine. In addition, account must also be taken of the dimensional variations of the turbine blades due to centrifugal forces in operation.

Devices have already been proposed for controlling clearances at blade tips, which devices comprise means for taking air from an upstream portion of the high-pressure compressor, e.g. from its fourth stage, and from a downstream portion of the compressor, e.g. from its ninth stage. Each circuit for taking air includes a valve, with the opening and the closing of the valve being controlled by a control system. The air taken in this way is conveyed to the outer casing in order to cool it or to heat it, thereby adjusting the clearance at the tips of the moving blades of the high-pressure turbine (see document FR 2 828 908-A1 in the name of the Applicant).

The control system receives information relating to the speed of the engine, to the temperature of the outer casing, to the temperature at the outlet from the high-pressure compressor, together with information relating to the operation of the engine (idling on the ground, starting while hot or while cold, temporary acceleration or deceleration, . . . ).

That known device is complex, since it requires separate valves and circuits to be installed for taking air from the upstream and downstream portions of the high-pressure compressor. It is necessary to control the extent to which the valves are opened in order to have full control over the temperature of the air that is to impact against the outer casing, and that likewise is complicated. Furthermore, that type of device is found to be particularly heavy and bulky. Finally, taking air from the downstream portion of the high-pressure compressor is disadvantageous, since it consumes air at very high pressure and thus penalizes the efficiency of the engine.

Another problem arises when restarting the engine while hot, i.e. on restarting the turbine engine after it has been stopped for a length of time that is insufficient for the temperature of the engine and in particular for the temperature of the rotor disk of the high-pressure turbine to have returned to ambient temperature. After the engine has stopped, it is observed that it cools more quickly in its bottom portion (at six o'clock) than in its top portion (at twelve o'clock), which leads to the rotor of the high-pressure turbine occupying an off-center position within the outer casing. Thus, the clearance at the blade tips in the bottom position is reduced and centrifuging the rotor blades of the high-pressure turbine can lead to rubbing against the outer casing in its bottom position.

Proposals have also been made for a device for controlling clearance by electrically heating the outer casing, thus making it possible to accommodate accelerations and to avoid the harmful effects of hot restarts, but that does not enable the casing to be cooled in order to reduce clearance during cruising flight.

BRIEF SUMMARY OF THE INVENTION

A particular object of the invention is to provide a solution to those problems of the prior art that is simple, effective, and inexpensive.

To this end, the invention provides a turbine engine including means for controlling the clearance between the tips of moving blades of a high-pressure turbine and an outer casing surrounding the blades, the control means comprising air-impact cooling means for cooling the outer casing by the impact of air taken from a high-pressure compressor stage of the engine, the turbine engine being characterized in that it further comprises first electric heater means for heating the top portion of the outer casing and second electric heater means for heating the bottom portion of the outer casing, together with on/off control means for controlling the air-impact cooling means, and independent means for controlling the first and second electric heater means.

By combining means for cooling the casing by air-impact with means for electrically heating the casing, the invention makes it possible to benefit from the advantages of both systems, while avoiding their respective drawbacks.

Integrating electric heater means for the outer casing makes it possible to eliminate the circuit for taking hot air from the downstream portion of high-pressure compressor and thus improve the performance of the turbine engine.

Operating the air-impact cooling means in on/off mode enables the design of the clearance control means to be simplified, since there is no longer any need to control the extent to which a valve is open, as in the prior art.

Furthermore, the independent operation of the electric heater means for the top portion and for the bottom portion of the casing makes it possible to provide a solution to the problem of restarting the turbine engine while hot, specifically by causing only the bottom portion of the outer casing to be heated so as to avoid contact with the tips of the blades of the high-pressure turbine rotor.

According to another characteristic of the invention, the air-impact cooling means comprise a ring carried by an outer casing and including projections that are axially spaced apart from one another with multiply-perforated strips being installed therebetween for delivering the air taken from the high-pressure compressor.

The means for taking air from the high-pressure compressor may include means for opening and closing the delivery of air to the outer casing.

In a particular embodiment of the invention, the cooling air is taken from the fourth stage of the high-pressure compressor at a rate that is about 0.7% of the total air flow rate through the compressor.

In an embodiment of the invention, the electric heater means comprise resistive circuits carried by the outer casing on the top and bottom portions thereof.

Advantageously, the resistive circuits are mounted in the vicinity of the projections of the ring carried by the outer casing.

The invention also provides a method of controlling clearance at the tips of high-pressure turbine blades in a turbine engine as described above, the method consisting, when restarting the turbine engine while hot, in activating the electric heater means for the bottom portion of the high-pressure turbine casing at maximum power and in deactivating the heater means for heating the top portion of the casing.

Thus, the electric heater means for the bottom portion are activated during a hot restart to avoid increasing blade tip clearances and reducing the efficiency of the turbine.

The method also consists in activating the electric heater means for heating the bottom portion of the outer casing to a power equal to 50% of their maximum electrical power, during a cold start of the turbine engine.

At the beginning of a stage of increasing turbine engine speed following a hot restart, the power to the electric heater means of the bottom portion is temporarily decreased to about 50% of the above-specified maximum electrical power, with the electrical power subsequently being increased until it reaches about 75% of the maximum electrical power.

In similar manner, at the beginning of a stage of increasing the speed of the turbine engine following a cold start, the electric heater means of the bottom portion are temporarily deactivated and then reactivated in order to reach power equal to 75% of their maximum electrical power.

This reduction in heating during a hot start or a cold start at the beginning of the increase in speed avoids the outer casing expanding too quickly compared with the high-pressure turbine rotor and thus avoids increasing clearances at the beginning of an increase in speed of the turbine engine that would worsen leakage of air past the blade tips.

According to another characteristic of the method of the invention, the electric heater means for heating the bottom portion of the outer casing are activated at full power prior to a reduction in the speed of the turbine engine during a cruising stage, in order to avoid the outer casing contracting too quickly as a result of the decrease of temperature in the primary passage, thereby preventing contacts with the blade tips.

Advantageously, during a cruising stage, all of the electric heater means of the outer casing are deactivated and the air-impact cooling means are activated.

The invention can be better understood and other details, advantages, and characteristics of the invention appear on reading the following description made by way of non-limiting example and with reference to the accompanying drawings, in which:

DETAILED DESCRIPTION OF THE INVENTION

Figure 1:
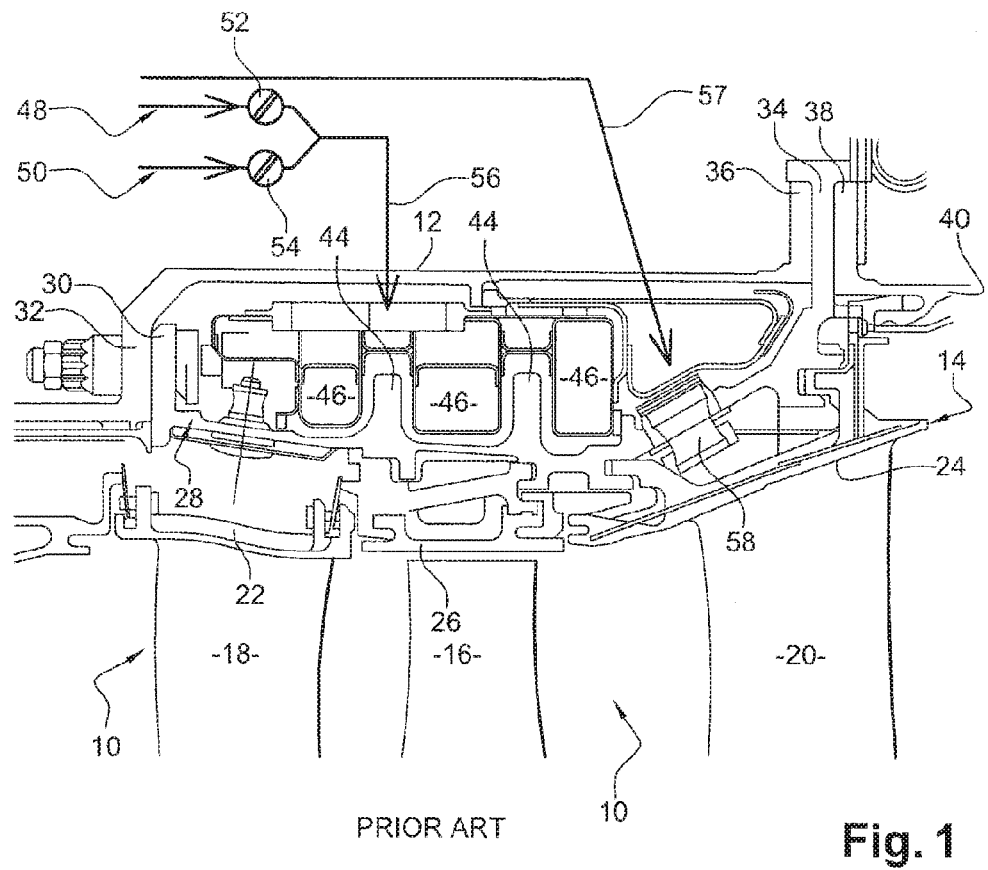
FIG. 1 is a fragmentary diagrammatic axial section view of a high-pressure turbine and of a prior art device for controlling blade tip clearances.

Reference is made initially to FIG. 1, which shows a top portion of a high-pressure turbine that is arranged at the outlet from a combustion chamber and upstream from a low-pressure turbine, and that comprises an outer casing 12 and a wall 14 defining the outside of the primary air stream flow passage within which a bladed rotor wheel 16 rotates, which wheel is mounted between two rows of stationary vanes, an upstream row 18 and a downstream row 20. The wall 14 is made up of annular segments 22 and 24 that carry the stationary vanes 18 and 20, and by annular segments 26 arranged between the annular segments 22 and 24 and radially facing outer ends of the moving blades 16 carried by a rotor disk of the high-pressure turbine (not shown).

A ring 28 is interposed between the outer casing 12 and the wall 14, and at its upstream end it includes a radial flange 30 fastened by bolting to a shoulder 32 of the outer casing 12, the downstream end including a radial flange 34 that is clamped between a radial flange 36 at the downstream end of the outer casing 12 and a radial flange 38 at the upstream end of a casing 40 of the downstream low-pressure turbine. This ring 28 carries the annular segments 26 surrounding the moving blades 16 via a spacer 42, and it also includes a plurality of projections 44 that are axially spaced apart from one another and between which multiply-perforated strips 46 are installed.

Means for controlling clearances between the tips of the blades 16 and the annular segments 26 comprise a circuit 48 for taking cold air from an upstream portion of the compressor, e.g. from the fourth compression stage, and a circuit 50 for taking hot air from a downstream portion of the compressor, e.g. from the ninth compression stage. Each of the circuits 48 and 50 for taking cold air and hot air, respectively, has its outlet connected to a respective valve 52, 54 that controls the rates at which cold air and hot air are taken. A duct 56 connected to the outlets of the valves serves to inject the mixture of air that has been taken into the high-pressure compressor in the multiply-perforated strip 46 thereof, from which the air is ejected and impacts against the ring 28 in order to cool it or heat it.

A third circuit 57 for taking air from the fourth stage of the high-pressure compressor is provided in order to cool the low-pressure turbine. For this purpose, the cold air that is taken is injected directly into the inside of the primary air stream flow passage via the outer casing 12 and it passes through orifices 58 in the ring 28 leading to the row of stationary vanes 20. The flow rate of this cooling air is about 2% of the total flow rate of air through the high-pressure compressor.

In general, it can readily be understood that the cooling or the heating of the ring by impact of air taken from the high-pressure compressor gives rise to cooling or heating, respectively, of the outer casing 12 and of the ring 28. This heating or cooling serves to control the radial position of the annular segments 26 facing the moving blades 16, and thus to control the clearance at the tips of the moving blades 16.

The mixing of cold air and hot air for impacting against the ring 28 is controlled by means of a full authority digital engine controller (FADEC) system that controls the turbine engine and that takes various kinds of information into account such as, for example: the operating mode of the engine; the temperature of the outer casing 12; and the length of time the engine has been stopped between two utilizations, in order to determine the appropriate settings for opening the valves 54 and 52 and thus for minimizing clearance at the tips of the blades 16.

Figure 2A:
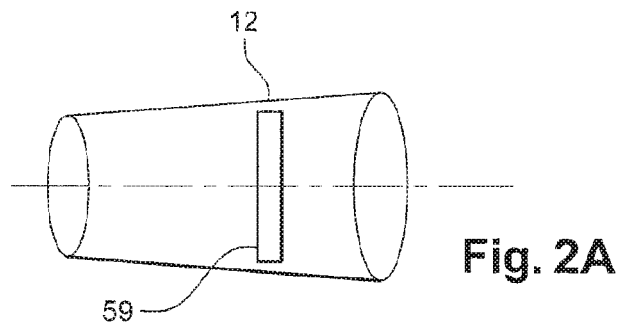
FIGS. 2A and 2B are diagrammatic views of a turbomachine while restarting when cold and when hot.

For example, when the engine is started cold and is idling on the ground, the outer casing 12 and the rotor disk of the high-pressure turbine are in temperature equilibrium (FIG. 2A). The high-pressure turbine 59 is thus centered inside the outer casing 12. Because of the thermal inertia of the rotor disk of the high-pressure turbine and because of the faster expansion of the outer casing 12, it is necessary in this configuration to cool the outer casing 12 in order to avoid increasing clearance at the blade tips. Thus, the control system causes the valve 52 for taking cold air from the fourth compression stage to open and causes the valve 54 for taking hot air from the ninth compression stage to close. The air that has been taken is then conveyed to the multiply-perforated strips 46 and it leaves them so as to impact against the projections 44 of the ring 28 and cool the ring 28 and the outer casing.

Nevertheless, these means for cooling and heating by impacting air against the outer casing 12 operate in a manner that is uniform around the entire circumference of the high-pressure turbine, i.e. the entire circumference of the ring 28 has the same mixture of air coming from the high-pressure compressor impacting thereagainst, and this is not satisfactory in the event of the turbine engine being restarted when hot.

Figure 2B:
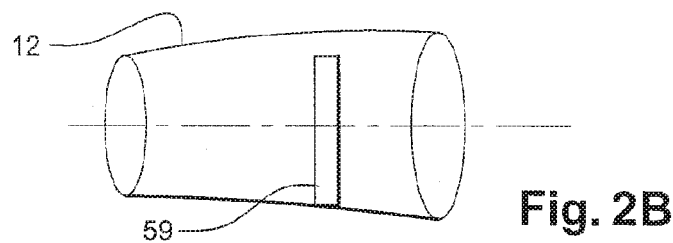

Since the outer casing 12 cools more quickly than the rotor disk of the high-pressure turbine (it takes about five hours for the disk cool down), and since the turbine engine cools more quickly in its bottom portion than in its top portion, it is found that the rotor of the high-pressure turbine 59 is moved off-center inside the outer casing 12 (FIG. 2B). In the event of restarting while hot, the clearances at the tips of the blades in the bottom position are very small and the effect of centrifugal force on the rotor of the high-pressure turbine causes the radial dimension of the moving blades 16 to increase and thus leads to contact occurring in the bottom position between the radially outer ends of the moving blades 16 and the annular segments 26 situated facing them.

The use of clearance control means operating by air impact, of the kind described above, would lead to the entire circumference of the outer casing 12 being expanded uniformly, and thus to an excessive increase in the clearance at the tips of the blades in the top portion of the turbine engine.

The invention provides a solution to this problem and to those mentioned above by eliminating the means 50 for taking hot air from the high-pressure compressor and by replacing them with first electric heater means for heating the top portion of the outer casing 12, which means are controlled independently of second electric heater means for heating the bottom portion of the outer casing 12. Electric heating of the outer casing 12 is found to be faster and thus more reactive than heating by hot air-impact, and it does not diminish the performance of the high-pressure compressor of the turbine engine.

Figure 3:
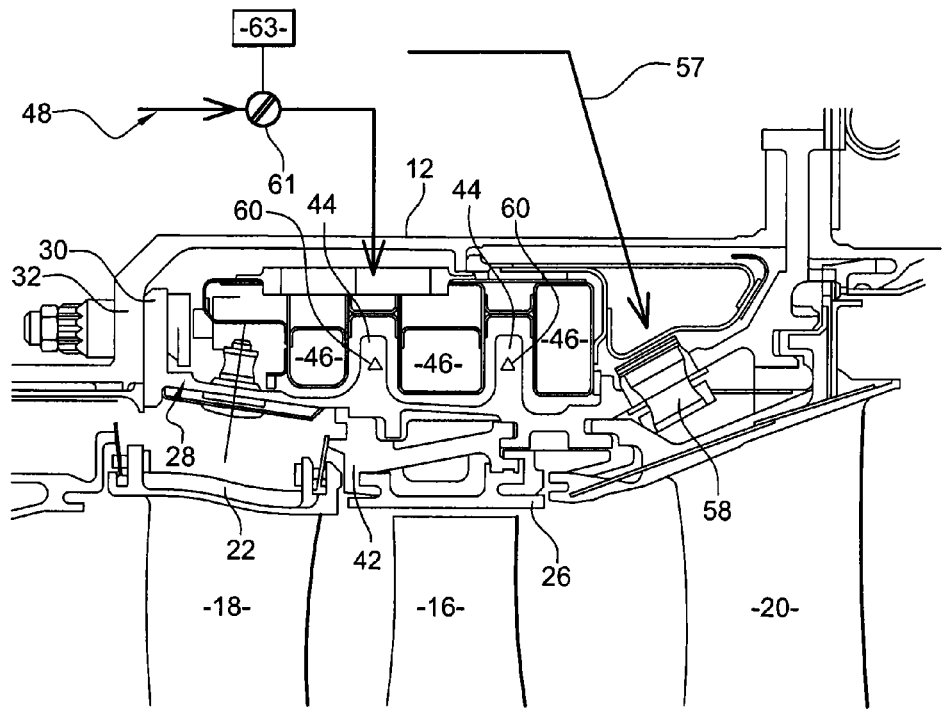
FIG. 3 is a fragmentary diagrammatic axial section view of a high-pressure turbine and of a device of the invention for controlling blade tip clearances.

The first and second electric heater means 60 for heating the top and bottom portions of the outer casing 12 are mounted in the vicinity of the projections 44 of the ring 28, as shown in FIG. 3, and they may be constituted by resistive type circuits.

Independent control means are provided for the first and second electric heater means 60 and they are connected to the FADEC system so as to control the heating of the bottom and top portions of the outer casing 12 independently, thereby making it possible to respond to the problem of restarting the turbine engine while hot, and as explained in greater detail below.

The outer casing 12 is cooled by air-impact cooling means as described above, i.e. via a circuit 48 for taking air from the fourth high-pressure compressor stage, this air being fed to the multiply-perforated strips 46 and being injected towards the projections 44 of the ring 28. Unlike the prior art, the cooling means may include a valve 61 that is subjected to on/off control by control means 63 connected to the FADEC system.

Figure 4:
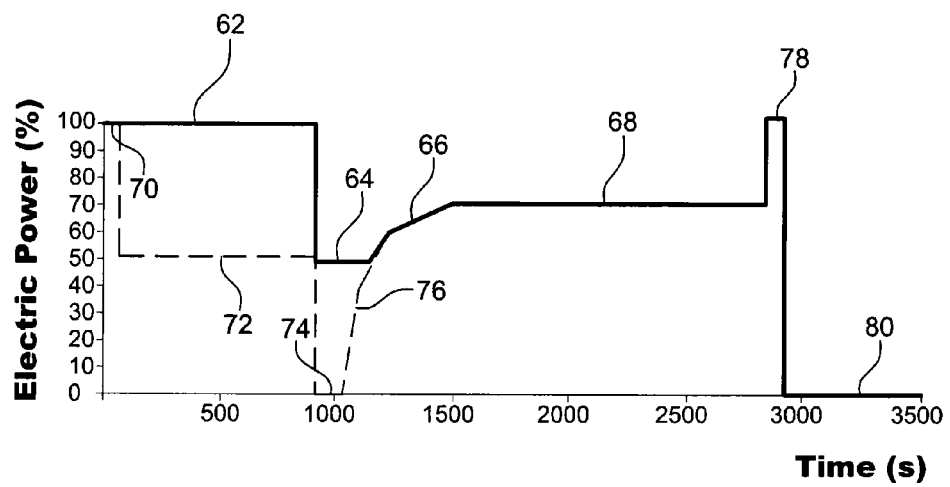
FIG. 4 is a graph showing variations in the power of the electric heater means for heating the bottom portion of the turbine engine of the invention.

FIG. 4 is a graph showing variations in the power applied to the electric heater means for the bottom portion of the turbine engine during a cold restart as a dashed line and during a hot restart as a continuous line.

In order to avoid contacts between the tips of the blades in the bottom portion of the turbine engine during a hot restart, the electric heater means for the bottom portion of the ring 28 are actuated at full power as shown at 62, thereby causing the ring to expand and thus increasing the clearance at the tips of the blades in this portion. Similarly, the electric heater means for the top portion of the ring 28 are deactivated since the clearance at the tips of the blades 16 in this location is sufficient, as explained above, thereby avoiding any increase in the clearance at the tips of the blades in the top portion, where such increased clearance would degrade the performance of the turbine engine.

Following a restart and at the beginning of a stage of increasing the speed of the engine, the electric heater means for heating the bottom portion are temporarily powered at about 50% of their maximum power, as shown at 64, thereby avoiding any increase in clearance as a result of the outer casing 12 expanding rapidly due to the combined effect of the electric heating and of the increase in the temperature of the gas in the primary passage resulting from the increase in speed.

The electrical power is then progressively increased once more, as shown at 66, until it reaches about 75% of maximum power, as shown at 68, in order to readjust the clearance at the blade tips as a result of the progressive expansion of the rotor disk of the high-pressure turbine rotor disk.

The invention can also be used during cold starting of the turbine engine (FIG. 4). Under such circumstances, the electric heater means for heating the bottom portion are activated at full power for a short period, as shown at 70 (typically 3 seconds) until the ground idling speed has become established, after which the power supplied thereto is reduced, as shown at 72, to 50% of the maximum power. While idling on the ground, there is no need to expand the bottom portion of the outer casing significantly, since the rotor of the high-pressure turbine is not in an off-center position within the outer casing 12.

When beginning to increase the speed of the engine after a cold start, the electric heater means for heating the bottom portion are temporarily deactivated, as shown at 74, in order to avoid the outer casing expanding quickly, as explained above with reference to increasing speed after a hot restart.

The electrical power is then progressively increased once more, as shown at 76, until it reaches about 75% of the maximum power, as shown at 68, so as to readjust the clearance at the blade tips resulting from the progressive expansion of the high-pressure turbine rotor disk.

The electric heater means for heating the bottom portion of the outer casing 12 are activated at full power, as shown at 78, before slowing engine speed down during a cruising stage, regardless of whether the engine was restarted while cold or while hot. This avoids the outer casing contracting too quickly and makes it possible to maintain a sufficient temperature for the time needed to decrease the radial dimensions of the moving blades due to the drop in temperature that results from reducing speed.

During a cruising stage, as shown at 80, the electric heater means are deactivated, and only the air-impact cooling means are activated, with the valve being put into its open position.

The invention thus makes it possible to have air-impact cooling means that operate only during a cruising stage, during which they operate in an on/off mode of operation, which mode is very simple to implement.

The invention claimed is:

1. A turbine engine comprising:
   moving blades of a high-pressure turbine;
   an outer casing surrounding the blades to form a clearance between tips of the moving blades and the outer casing;
   an air-impact cooling device configured to cool the outer casing by impact of air taken from a high-pressure compressor stage of the engine, the air impact cooling device comprising an on/off valve for opening and closing delivery of air to the outer casing;
   first electric heater configured to at a top portion of the outer casing;
   second electric heater configured to heat a bottom portion of the outer casing; and
   a controller configured to independently control the on/off valve of the air-impact cooling device, the first electric heater, and the second electric heater.

2. A turbine engine according to claim 1, wherein the air-impact cooling device includes a ring carried by said outer casing and comprising projections that are axially spaced apart from one another with multiply-perforated strips installed therebetween for delivering the air taken from the high-pressure compressor.

3. A turbine engine according to claim 1, wherein the cooling air is taken from a fourth stage of the high-pressure compressor at a rate that is about 0.7% of total air flow rate through the compressor.

4. A turbine engine according to claim 1, wherein the first electric heater comprises a resistive circuit carried by the outer casing on the top portion thereof, and the second electric heater comprises a resistance circuit carried by the outer casing on a bottom portion thereof.

5. A turbine engine according to claim 4, wherein the resistive circuits are mounted in a vicinity of projections of a ring carried by the casing.

6. A method of controlling clearance at tips of high-pressure turbine blades in a turbine engine according to claim 1, the method comprising, when restarting the turbine engine while hot, activating the second electric heater for the bottom portion of the high-pressure turbine casing at maximum power, and deactivating the first electric heater for heating the top portion of the casing.

7. A method according to claim 6, wherein, at a beginning of a stage of increasing turbine engine speed following a hot restart, power to the second electric heater of the bottom portion is temporarily decreased to about 50% of maximum electrical power, with the electrical power subsequently being increased until it reaches about 75% of the maximum electrical power.

8. A method according to claim 6, wherein, during a cold start of the turbine engine, further comprising activating the second electric heater for heating the bottom portion of the outer casing to a power equal to 50% of its maximum electrical power.

9. A method according to claim 8, wherein, at a beginning of a stage of increasing speed of the turbine engine following a cold start, the second electric heater of the bottom portion is temporarily deactivated and then reactivated with power equal to 75% of its maximum electrical power.

10. A method according to claim 6, wherein the second electric heater for heating the bottom portion of the outer casing is activated at full power prior to a reduction in speed of the turbine engine during a cruising stage.

11. A method according to claim 6, wherein, during a cruising stage, further comprising deactivating both of the first and second electric heaters of the outer casing and activating the air-impact cooling device.

* * * * *